Dec. 15, 1931.  B. V. CURRY ET AL  1,836,227
SINGLE TANDEM DISK HARROW
Filed April 13, 1929   2 Sheets-Sheet 1

Inventor
Byron Vincent Curry
Joseph R. Barker
By Lyon & Lyon
Attorney

Patented Dec. 15, 1931

1,836,227

UNITED STATES PATENT OFFICE

BYRON V. CURRY, OF SANTA ANA, AND JOSEPH R. BARKER, OF FALLBROOK, CALIFORNIA, ASSIGNORS TO B. V. CURRY, TRUSTEE

SINGLE TANDEM DISK HARROW

Application filed April 13, 1929. Serial No. 354,745.

This invention relates to single tandem disk harrows or implements of the type disclosed in the copending application of Joseph R. Barker filed March 2, 1929, Serial No. 343,984.

The principal object of our invention is to provide means interconnecting the gangs of a single tandem disk implement and a draft element, so that the normal straight-ahead pull of the tractor or other draft appliance will cause the gangs to assume a desired working angle but which will change the angular relation between the gangs of disks when the draft appliance is turned to turn the tandem disk implement.

Another object of this invention is to provide a system for interconnecting the several gangs of a tandem disk implement, and for connecting the same to a draft appliance so that during the straight-ahead pull of the draft appliance the gangs will assume a desired working angle with reference to each other, and with reference to the draft appliance, but which will permit of turning the tandem disk implement in either direction without the necessity of backing up of the draft appliance.

Another object of this invention is to provide a device for connecting the two gangs of a single tandem disk implement together with one end of each of the gangs in relatively close relation, but which connecting device may be extended to allow a relatively great spacing of the gangs when the draft appliance is turned.

Figure 1:
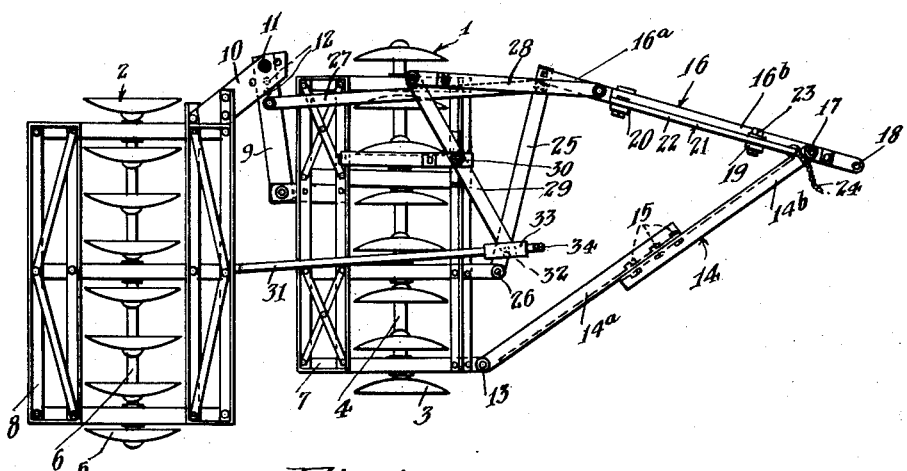
Figure 1 is a top plan view of a disk implement embodying this invention.

In the preferred embodiment of our invention illustrated in the accompanying drawings, 1 indicates a forward gang of disks and 2 a rearward gang of disks. The forward gang 1 includes a plurality of disks 3 mounted on a single gang rod 4, the disks 3 being preferably of the common concave-convex form and having their concave sides turned toward one end of the forward gang 1. The disks 5 of the rear gang 2 are also mounted on a gang rod 6 and have their concave sides turned toward the opposed end of the rear gang. In some cases it proves advantageous to divide the gang rods 4 and 6 as shown in the Towner Patent No. 1,627,356.

The forward gang of disks is mounted in a suitable supporting frame structure 7, while a similar frame 8 mounts the rearward gang 2.

The two gangs are connected in tandem relation through an extensible hinge comprising a hinge extending link or bar 9 which is connected to the forward gang at a point spaced inwardly from the left hand end of this gang. The outer end of the link 9 is provided with a plurality of openings 12, through any one of which may be inserted a connecting pin 11 which passes through suitable openings in a pair of hinge plates 10 rigidly secured to one end of the frame 8 of the rearward gang 2. This construction constitutes an extensible hinge or pivotal connection between the two gangs so that when the implement is drawn forward the rearward gang 2 will assume a definite angle with reference to the forward gang, this angle being the desired working angle for the proper tillage of the soil by the tandem gang implement.

The hinge extending link 9 is normally held in a non-extended position, that is, folded closely adjacent to the frame 7 of the forward gang 1 by means of a system of links and levers through which the draft appliance, such as a tractor or other similar power device, may be connected to the tandem disk implement for the purpose of drawing the same over the ground to be tilled.

The system of links and levers comprises a coupling 18 formed upon the outer end of a draft link 16b, which forms one of a pair of slidingly extensible links constituting a draft bar 16, the other of which is an extension link designated by the reference character 16a. These two links are slidably connected together by means of inter-engaging guides 19 and 20, so that the structure may be telescoped to constitute a short draft bar or may be extended to constitute a long draft bar. The rearward end of the extension link 16a is connected by means of a hinge adjusting link 27 to the hinge extending bar 9, so that a forward pull on the coupling 18 and draft bar 16 is transmitted to the bar 9 and causes the bar 9 to be drawn toward the frame 7 to thus keep the hinge connection between the two gangs in close relation to the forward gang 1. Inward movement of the link 16a is prevented by means of a draft bar connecting link 25 pivotally connected at one end to the link 16a, and at its other end 26 to the frame 7 for the forward gang 1.

An off-set adjustment bar 14 is provided with a pivotal connection 17 connecting the same to the draft bar 16 at a point close to the coupling 18. The other end of the bar 14 is pivotally connected as at 13 to the frame 7 of the forward gang 1. The off-set adjustment bar 14 is illustrated as comprising a pair of relatively adjustable angle members 14a and 14b which may be adjustably connected as by means of bolts 15, so that the length of the offset adjustment bar may be varied to thereby vary the angle of offset at which the forward gang will ride when a straight-ahead pull is exerted by the tractor or other draft appliance. The construction thus far described constitutes a triangular connection between the draft appliance or tractor and the forward gang 1 of the disk implement.

When the draft appliance or tractor is driven straight-ahead the links 14, 16 and 27, and the bar 9, will cause the drawing forward of the tandem disk implement either in a position to directly trail the tractor, or at a position offset from the direction of movement of the tractor, depending upon the amount of extension given to the draft bar 16. The extension of draft bar 16 may be adjusted to any suitable length for varying degrees of offset of the disk implement, by means of a connecting ratchet bar 22 secured to the draft link 16b and having thereon a number of ratchet notches for engagement with a pin 23 carried by extension link 16a, for example, on the guide 19. With the draft bar 16 extended to a desired amount, one of the notches in the ratchet bar 22 will engage the pin 23 to maintain the draft bar 16 at the desired length.

Figure 2:
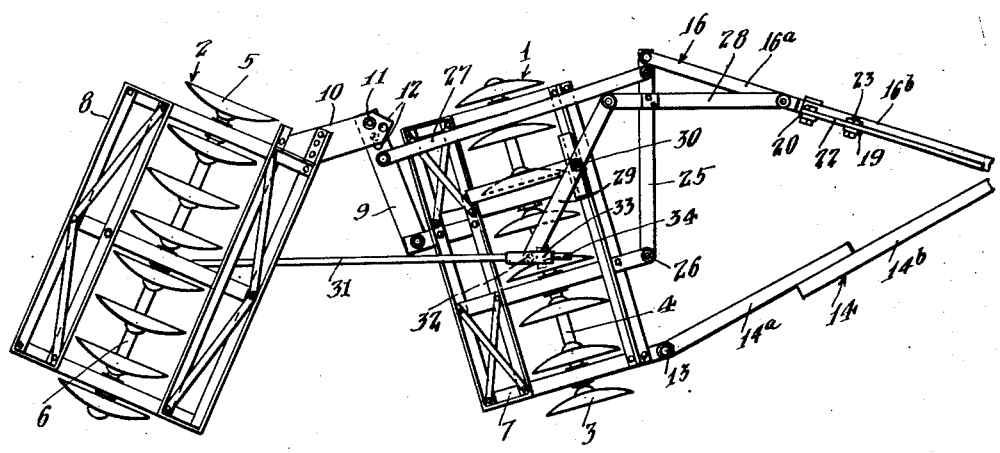
Figure 2 is a similar top plan view illustrating the implement with the gangs angled apart to working position.

With the arrangement just described, the forward movement of the tractor will cause the disks to assume a position such as that illustrated in Fig. 2, in which the forward gang 1 assumes a position with reference to the tractor at an angle thereto, the apex of which is toward the right hand side of the implement, while the rearward gang 2 will assume an angular position with reference to the forward gang 1, the apex of which is toward the left hand side of the implement. The angle assumed by the two gangs will depend upon the setting of the cutting disks with reference to their associated frames, and by the amount of offset of the path of the implement with reference to the path of the tractor or draft appliance.

When the tandem disk implement is in this position, it is relatively easy to turn the same in the left hand direction, since the angular relation between the two gangs is such as to allow them to readily follow each other in a turn to the left. However, when an attempt is made to turn the implement to the right the angular position of the two gangs is incorrect to allow them to follow each other in that direction, and for this reason it is necessary to alter the angular position of the gangs in order to make a right hand turn. This may be done by backing up the tractor, but this requires considerable loss of time and is not a satisfactory method of turning the tandem disk implement.

By connecting the two gangs through the extensible hinge formed by plates 10 and hinge extending bar 9 the necessary change in angular relation between the two gangs is accomplished without the necessity of backing the tractor. A lateral pull on the draft bar 16, as occurs when the tractor turns to the left, causes the forward gang to rotate in a clockwise direction relative to the draft bar, by reason of the fact that the offset bar tends, in effect, to push the right hand end of the tractor back or causes the left hand end of the forward gang to move at a more rapid rate than does the right hand end of this gang.

Figure 3:
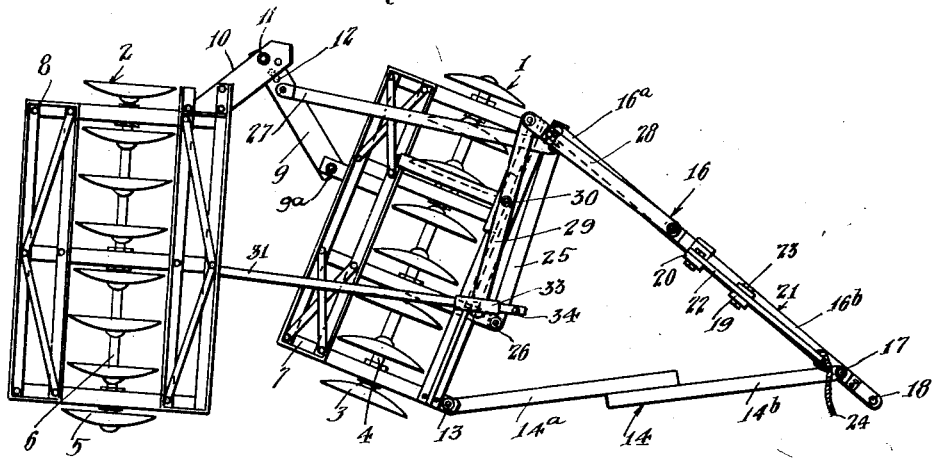
Figure 3 is a similar top plan view illustrating the implement with the gangs angled apart as in making a right turn with the implement as the implement is traveling ahead.
Figure 4:
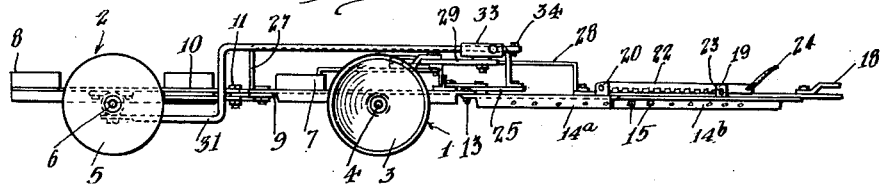
Figure 4 is a side elevation of the disk implement embodying our invention.

Thus, the right hand end of the gang swings forward with reference to the draft bar 16, the extensible hinge 10—9 allowing this movement without at the same time pulling forward the rearward gang 2. The two gangs are now in the position illustrated in Figure 3, that is, the left hand ends of the gangs are spaced apart while the right hand end of the gangs are close together, the proper position for allowing the gangs to follow each other around a right hand turn.

This operation may be facilitated by connecting the rearward end of the draft link 16b, as by a short link 28 to one end of a spacing lever 29 which is pivoted at approximately its center to the frame 7 of the forward gang 1. The opposite end of the spacing lever 29 is pivotally connected, as at 32, to a connection 33 which clamps or is otherwise secured to a spacing bar 31. The opposite end of the spacing bar 31 is pivotally connected to the rearward gang 2 and at some position adjacent the center of this gang.

Thus, when the draft bar 16 is pulled straight ahead the spacing lever will be in the position shown in Fig. 2, allowing the spacer bar to be extended rearwardly and thus limit the working angle of the two gangs. But when the draft bar 16 is pulled laterally as in making a right hand turn the consequent rotation of the forward gang 1 will cause the spacing lever to be rotated to the position shown in Fig. 3, and will assist in causing the right hand ends of the gangs to be drawn together.

However, after the gang has been turned and the tractor again assumes its straight-ahead movement the forward pull on the links 16 and 14 will cause the forward gang 1 to again swing to the right to assume its normal offset position, and since the connection between the draft implement and the forward gang 1 is at the right hand end of this gang, this gang is again rotated in a counter-clockwise direction to cause the gang to again assume the position illustrated in Fig. 2. When the forward gang 1 has rotated into this position, the left hand end of the forward gang 1 is again positioned closely adjacent the bar 9 and the rearward gang 2 therefore swings into its position as illustrated in Fig. 2, and the tandem disk implement is moved forward with the disks in the normal working angle as illustrated.

To close up the gangs from the position of Figure 2 to the non-working position of Figure 1, the implement need only be backed and the ratchet bar 22 be raised. If inclined teeth are formed on the bar 22 in a manner well understood in the art, the ratchet bar 22 need not be raised but will run back and the portions 16a and 16b of the bar 16 are telescoped over each other.

Having fully described our invention and illustrated the same with a preferred embodiment thereof, it is to be understood that our invention is not limited to this preferred embodiment but may take many and diverse forms and be included in many forms of construction without departing from the scope of our invention or the spirit thereof as defined in the appended claims.

We claim:

1. In a single tandem disk implement, a forward disk gang, a rearward disk gang, extensible hinge means pivotally connecting said gangs near one end thereof to allow the opposite ends of said gangs to separate to a working angle, a draft bar to which a draft appliance may be coupled, means connecting said draft bar to said forward gang for movement relative thereto, means for connecting the draft bar with the rearward disk gang, and means connecting said draft bar and said extensible hinge means whereby a forward pull on said draft bar holds said hinge in non-extended position and a lateral pull on said draft bar allows the hinge to separate that end of the two gangs.

2. In a single tandem disk implement, a forward disk gang, a rearward disk gang, extensible hinge means pivotally connecting said gangs near one end thereof to allow the opposite ends of said gang to separate to a working angle, comprising one hinge member rigidly secured to said rearward gang and a second hinge member connecting said rigid member to said forward gang at a point spaced a substantial distance from the end of said forward gang, a draft bar to which a draft appliance may be coupled, means connecting said draft bar to said forward gang for movement relative thereto, means connecting said draft bar to said extensible hinge means at a point near the end of said forward gang, and means connecting the draft bar with the rearward gang, whereby a forward pull on said draft bar holds said hinge in a non-extended position and a lateral pull on said draft bar allows the hinge to extend to separate that end of the two gangs.

3. In a single tandem disk implement, a forward disk gang, a rearward disk gang, an extensible hinge means pivotally connecting said gangs near one end thereof to allow the opposite ends of said gangs to separate to a working angle, said hinge means comprising one hinge member rigidly secured to the rearward gang at one end thereof, an extensible link, a hinge extending link, one end of which is pivotally secured to said first hinge member and the other end of which is pivotally secured to the forward gang at a point substantially spaced from the end of said gang, a draft bar to which a draft appliance may be coupled, means connecting said draft bar to said forward gang for movement relative thereto, and a link connecting said draft bar to said hinge extending link and near said rigid hinge member, and means connecting the draft bar with the rearward gang, whereby a forward pull on said draft bar holds said hinge in non-extended position and a lateral pull on said draft bar allows the hinge to extend to separate that end of the two gangs.

4. In a single tandem disk implement, a forward disk gang, a rearward disk gang, extensible hinge means pivotally connecting said gangs near one end thereof to allow the other ends of the gangs to separate to a working angle, a draft bar to which a draft appliance may be coupled, means connecting one end of said draft bar to said forward gang for movement relative thereto, an offset bar rigidly connecting the opposite end of said draft bar to the end of said forward gang opposite to said hinged end, means connecting the draft bar with the rearward gang of disks, and means connecting the end of said draft bar at said one end to said extensible hinge to keep said hinge in non-extended position when said draft bar is pulled forward and to extend said hinge when said draft bar is pulled forward and to extend said hinge when said draft bar is moved laterally.

5. In a single tandem disk implement, a forward disk gang, a rearward disk gang, extensible hinge means pivotally connecting said gangs near one end thereof to allow the opposite ends of said gangs to separate to a working angle, said hinge means comprising a hinge member rigidly secured to said rearward gang at one end thereof, a hinge extending link, one end of which is pivotally connected to said rigid hinge member and the other end of which is connected to said forward gang at a point spaced from the end thereof, a draft bar to one end of which a draft appliance may be coupled, a draft bar connecting link for connecting one end of said draft bar to said forward gang, for relative movement thereto, and a hinge adjusting link connecting said other end of said draft bar to said hinge extending link at a point near said rigid hinge member.

6. In a single tandem disk implement, a forward disk gang, a rearward disk gang, extensible hinge means pivotally connecting said gangs near one end thereof to allow the other ends of the gangs to separate to a working angle, a draft bar to one end of which a draft appliance may be coupled, means connecting the other end of said draft bar to said forward gang for movement relative thereto, means connecting said other end of said draft bar to said extensible hinge to keep said hinge in a non-extended position when said draft bar is pulled forward, and an offset bar rigidly secured to said one end of said draft bar to the end of said forward gang opposite to said hinge, and means connecting the draft bar with the rearward gang of disks, and whereby a lateral pull on said draft bar will rotate said draft bar and said extensible hinge, to thereby alter the angle of said gangs during a turning movement of the implement.

7. In a single tandem disk implement, a forward disk gang, a rearward disk gang, extensible hinge means pivotally connecting said gangs near one end thereof to allow the opposite ends of said gangs to separate to a working angle, a draft bar to which a draft appliance may be coupled, said draft bar comprising a pair of members extensible relative to each other, a spacing bar for limiting the angle between said two gangs, a lever pivoted to said forward gang and having opposite ends thereof connected respectively to said spacing bar and said draft bar, an offset bar connecting said draft bar to the end of said forward gang opposite to said hinged end, whereby forward pull on the draft bar allows said gangs to assume a working angle and a lateral pull on said draft bar rotates said forward gang relative to said spacing lever to reduce the angle between said two gangs.

8. In a single tandem disk implement, a forward disk gang, a rearward disk gang, extensible hinge means pivotally connecting said gangs near an end thereof to allow the opposite ends of said gangs to separate to a working angle, a draft bar comprising a draft link and an extension link slidably connected to said draft link, means on said draft link for coupling a draft appliance thereto, means connecting said extension link to said forward gang for relative movement thereto, means connecting said extension link to said extensible hinge means, a spacing bar for limiting the working angle between said two gangs, a spacing lever pivoted to said forward gang, having one end thereof connected to said spacing bar and having the other end thereof connected to said draft link and an offset bar connecting said draft link to said forward gang at the end thereof opposite to said hinged end, whereby a forward pull on said draft link holds said hinge in non-extended position and allows the gangs to assume the working angle limited by said spacing bar and a lateral pull on said draft link rotates said forward gang relative to said hinge, and said spacing lever to close the angle between said gangs and to allow said gangs to assume an angular relation in a direction opposite to the working angle during a turning movement of the implement.

9. In a single tandem offset disk harrow, the combination of a forward gang of disks, a rearward gang of disks, an extensible hinge means connecting said gangs of disks to allow the gangs of disks to separate at one side of the harrow to working position, an offset bar secured to the forward gang of disks, a draft bar, means for securing the draft bar to the forward gang of disks at a point spaced from the offset bar and for movement relative to the forward gang of disks, means connecting the draft bar with the rearward disk gang at a point spaced from the hinge means, and means connecting the draft bar and the extensible hinge means whereby a forward pull on said draft bar holds said hinge in non-extended position and a lateral pull on the draft bar allows the hinge to separate that end of the two gangs.

Signed at Los Angeles, Calif., this 5th day of April, 1929.

BYRON V. CURRY.
JOSEPH R. BARKER.